Nov. 26, 1957　　　　D. W. BERRY　　　　2,814,349
AIRCRAFT PROPULSION APPARATUS
Filed April 30, 1956　　　　　　　　　　2 Sheets-Sheet 1
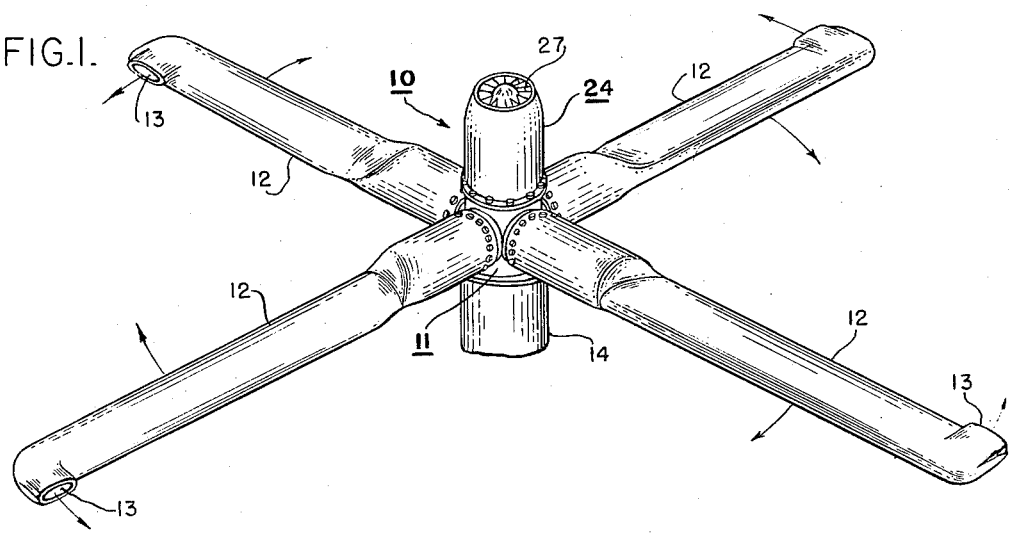
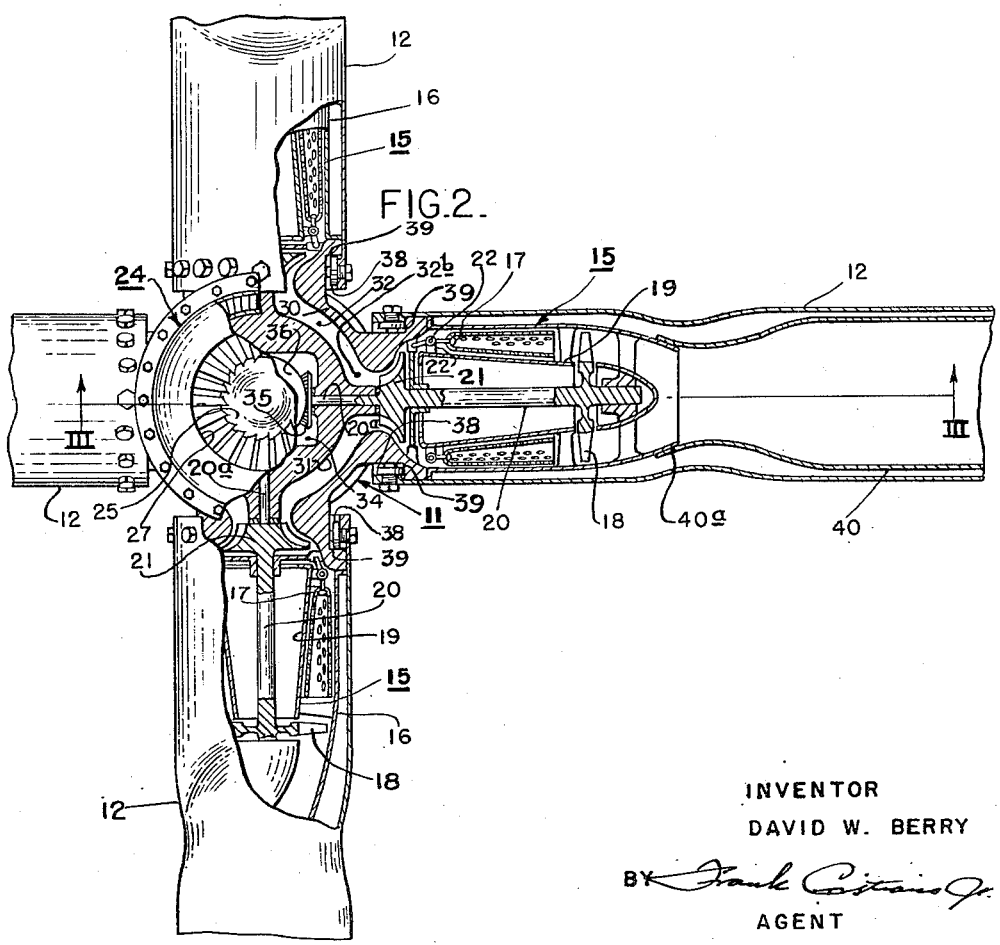
INVENTOR
DAVID W. BERRY
AGENT Nov. 26, 1957 D. W. BERRY 2,814,349
AIRCRAFT PROPULSION APPARATUS
Filed April 30, 1956 2 Sheets-Sheet 2
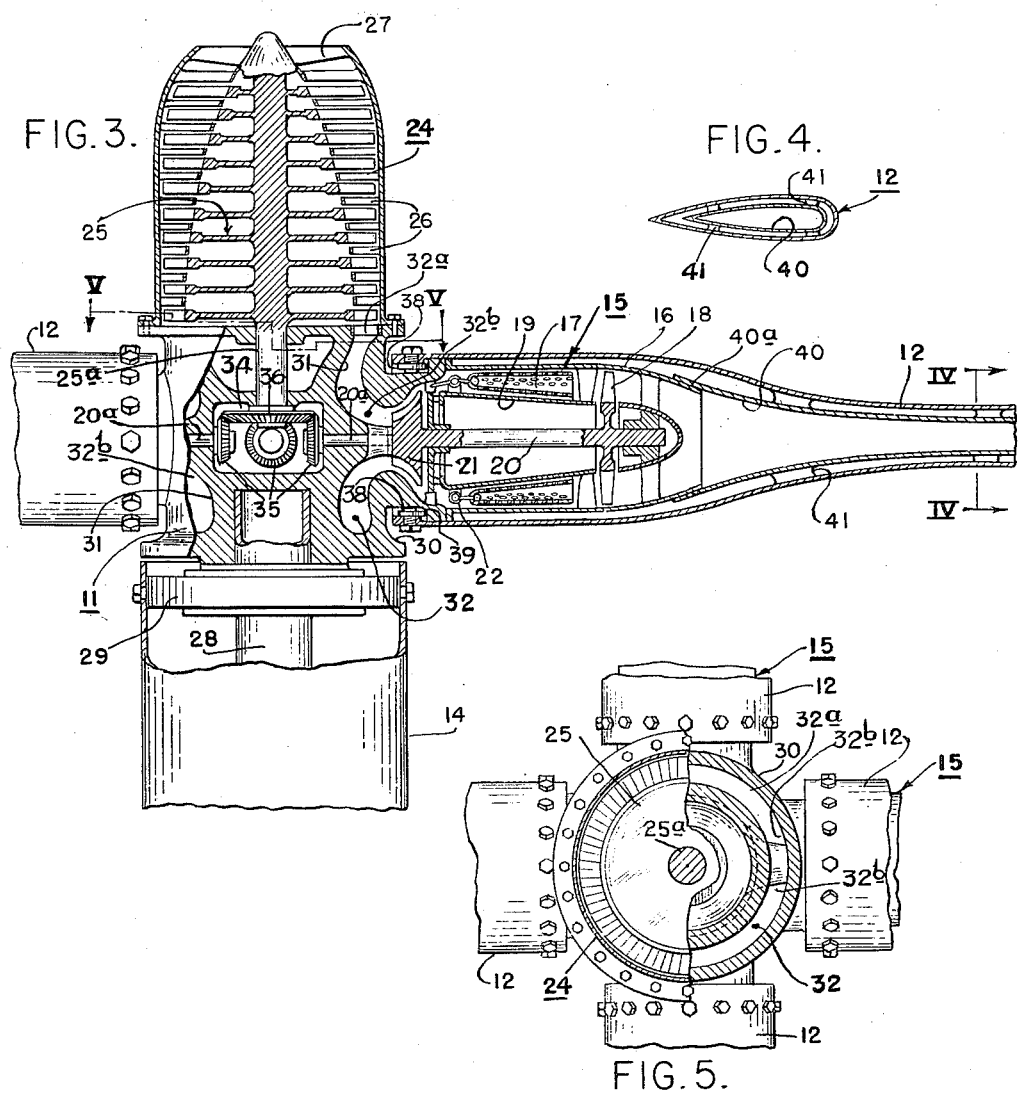
INVENTOR
DAVID W. BERRY
AGENT United States Patent Office 2,814,349

Patented Nov. 26, 1957

2,814,349

AIRCRAFT PROPULSION APPARATUS

David W. Berry, Kansas City, Kans., assignor to Westinghouse Electric Corporation, East Pittsburgh, Pa., a corporation of Pennsylvania Application April 30, 1956, Serial No. 581,781

5 Claims. (Cl. 170—135.4)

This invention relates to jet propelled rotors for aircraft, more particularly to jet propelled rotors for helicopters, and has for an object to provide an improved multiple gas turbine arrangement therefor.

It is another object of the invention to provide, in a helicopter rotor of the type having an air compressor vertically disposed in the hub, an improved and highly reliable driving arrangement for the compressor.

A further object of the invention is to provide, in a helicopter rotor, a plurality of symmetrically disposed gas turbines for driving a centrally disposed compressor which delivers air to said gas turbines.

In accordance with the invention, a helicopter rotor is provided with a vertically disposed air compressor in the hub portion and the rotor blades are provided with longitudinal ducts extending from the hub to the tips of the blades. Within each of the blades there is disposed a gas turbine having its inlet end in communication with the outlet of the compressor and its outlet in communication with the ducted opening at the tip of the blade, so that the exhaust from each of the turbines issues from the blade tips to jet propel the rotors. The rotor of the compressor is in driven relation with the rotor of each turbine, so that the shaft power taken from each turbine to drive said compressor is one quarter of the power absorbed by the compressor. Each of the turbines is also preferably provided with its own turbine-driven compressor.

The above and other objects are effected by the invention as will be apparent from the following description and claims taken in connection with the accompanying drawings, forming a part of this application, in which:

Fig. 1 is a perspective view of a helicopter rotor incorporating the invention;

Fig. 2 is an enlarged plan view of the rotor shown in Fig. 1, with some portions in section and the outer tip portions of the rotor blades broken away;

Fig. 3 is a vertical section taken on line III—III of Fig. 2, looking in the direction of the arrows;

Fig. 4 is a cross-section taken on line IV—IV of Fig. 3, looking in the direction of the arrows; and Fig. 5 is a cross-sectional view taken on line V—V of Fig. 3.

Referring to the drawings in detail, especially Fig. 1, there is shown a helicopter rotor 10 of the jet propelled type having a central hub portion 11 supporting a plurality of radially outwardly disposed blades 12 of airfoil shape. The blades 12 are of hollow construction and are provided at their tips with exhaust nozzle openings 13 for discharge of gases in the form of a jet to propel the rotor. The central hub portion 11 is rotatably mounted upon a pylon structure 14 which is usually attached to the fuselage (not shown) in any desired manner.

As best shown in Figs. 2, 3 and 5, each of the airfoil rotor blades 12 has disposed therein a gas turbine unit 15 for providing the hot jet propelling gases at the exhaust nozzles 13. Since the blades 12 and the turbine construction provided therein may be identical for all of the blades, only one will be described. The turbine unit 15 is provided with a casing 16 within which is disposed combustion apparatus 17, a turbine wheel 18 disposed downstream of the combustion apparatus 17, a central core member 19 cooperating with the casing 16 to provide an annular fluid flow passage through the turbine unit 15, and a central shaft 20 extending toward the hub 11 and carrying at its innermost end a compressor impeller 21. Also, means 22 for delivering fuel to the combustion apparatus 17 are provided, so that in operation the turbine unit operates in a somewhat conventional manner as follows: air drawn into the compressor impeller 21 is pressurized and delivered to the combustion apparatus 17, wherein it is mixed with fuel delivered by the means 22 and ignited to form hot gases which flow through the turbine wheel 18, thereby driving the shaft 20, which in turn drives the impeller 21. Only part of the energy of the gases is absorbed in the turbine wheel, the remainder flowing through the blade 12 in outward direction and being discharged through the exhaust nozzle 13 in a jet to propel the helicopter rotor.

Upon the hub 11 there is mounted a primary air compressor unit 24 preferably of the multiple-stage, axial-flow type having a bladed rotor structure 25 and a bladed stator structure 26. The compressor unit 24 is disposed in vertical alignment with the hub 11 and is provided with an air inlet opening 27 which faces upwardly.

The hub 11 may be rotatably supported upon the pylon 14 in any desired manner, for example, by a central shaft 28 attached to the hub and received in a bearing 29 disposed in the pylon. As best shown in Figs. 2 and 3, the hub is provided with an outer wall 30 and inner wall structure 31 arranged in such a manner that a passageway 32 is formed extending from the outlet of the compressor unit 24 to the inlet of the compressor impeller 21. The passageway 32 is of annular shape at 32a adjacent the outlet of the compressor unit 24, the annular passageway portion 32a being disposed normal to the axis of rotation of the helicopter rotor. The passageway 32 extends downwardly from the portion 32a and is curved in such a manner that it is provided with a plurality of outlet portions 32b (one for each of the rotor blades 12). Each of these outlet portions 32b is disposed normal to the inlet passageway 32a and is spaced angularly from the others, so that the passageway 32 divides at its outlet to provide each of the turbine units 15 with air from the compressor unit 24.

The inner wall structure 31 of the hub further defines a central chamber 34 which is disposed in isolated relation with the passageway 32. Within the chamber 34 there is disposed a driving gear 35 interconnecting the turbine 15 and the rotor 25 of the primary compressor in the following manner. The turbine shaft 20 has a power take-off portion 20a extending through the wall 31 into the chamber 34 and having attached thereto the driving gear 35 which is in meshed engagement with a driven gear 36 attached to an elongated shaft portion 25a of the primary compressor rotor 25. Referring to Fig. 3, it will be seen that the driven gear 36 is disposed in a central position and is in driven relation with each of the gears 35 attached to the power take-off shaft portions 20a of the turbines 15.

The helicopter blades 12 are preferably of the well-known variable pitch type, rotatable about a longitudinal axis relative to the hub, for a well known purpose. Accordingly, each of the blades 12 is provided with a series of rollers 38 received in an annular recess 39 in the hub 11. However, the turbine units 15 are non-rotatably attached to the outer wall structure 30 of the hub 11, so that they are not affected by rotatable movement of the blades 12.

Each of the blades 12 is further provided with an annular internal duct 40 spaced from the outer wall of the blade and held therein by a plurality of struts 41. The longitudinal duct 40 has one end 40a disposed in telescoping relation with the casing 16 of the turbine unit to permit relative rotatable movement therebetween and has its opposite end (not shown) in registry with the exhaust nozzle 13 at the tip of the blade.

In operation, each of the turbine units 15 may be started in the usual manner by feeding fuel thereto through the fuel delivery means 22 and ignition of the same by means (not shown) to create the motive gases for the turbine wheel 18. Upon rotation of the turbine wheel 18, the shaft 20 is rotated, thereby conjointly driving the impeller 21 and the driving gear 35. Since the driving gear 35 is in mesh with the driven gear 36, the primary compressor rotor 25 is also driven and air is drawn through the air inlet 27 into the compressor unit 24. The air is pressurized in transit therethrough and is then delivered to the passageway 32, where it divides and flows through each of the various passage outlets 32b to the turbine 15 associated therewith, whereupon it is further pressurized by the compressor impeller 21 before delivery to the combustion apparatus 17. The hot motive gases flowing through the blading of the turbine wheel 18 are directed through the duct 40 in a radially outward direction to the exhaust nozzle 13 to thereby propel the helicopter rotor.

Since the primary compressor rotor 25 is driven by each of the turbines 15, in this instance, four units, it will be seen that the energy absorbed by the primary compressor unit 24 is divided equally among the four turbine units, so that the gases are delivered, after only relatively small expansion, to the exhaust nozzles for propelling the helicopter rotor.

It will also be noted that the driving gears 35 and the driven gear 36 are disposed in the isolated chamber 34 where they are relatively unaffected by the temperatures of the turbine units.

It will now be seen that the invention provides a relatively simple and reliable arrangement for operating a turbine unit in a jet propelled helicopter rotor at high pressure ratio and accordingly high efficiency.

Also, since the primary compressor unit 24 is driven by the four turbine units in unison, should one of the turbine units be shut off or otherwise be rendered inactive, the remaining turbine units will still be effective to drive the primary compressor rotor.

This arrangement further provides a free wheeling effect to the helicopter rotor, so that in the event that all of the turbine units 15 are rendered inactive, the rotor may gyrate in a well known manner to permit a safe landing without power.

While the invention has been shown in but one form, it will be obvious to those skilled in the art that it is not so limited, but is susceptible of various changes and modifications without departing from the spirit thereof.

What is claimed is:

1. In a jet propelled helicopter rotor having a rotatably supported hub portion, a plurality of airfoil blades attached to said hub and extending radially outwardly therefrom, said blades being provided with longitudinal ducts extending from said hub to exhaust nozzles disposed adjacent the outermost tips of said blades, and an air compressor having a rotor mounted in a central position on said hub portion; a gas turbine disposed in each of said longitudinal ducts, said gas turbine having an air inlet, a gas discharge outlet and a power take-off shaft extending through said air inlet into said hub portion; said hub having a passage acting as a communication between the outlet of said compressor and the inlet of said gas turbine, whereby compressed air is delivered by said compressor to said gas turbine, and driving means interposed between said compressor rotor and said turbine power take-off shaft.

2. In a jet propelled helicopter rotor having a hub portion supported for rotation about a vertical axis, a plurality of airfoil blades extending radially outwardly from said hub and rotatably supported thereby, each of said blades being provided with a longitudinal duct extending from said hub to an exhaust nozzle disposed remotely from said hub, and a primary air compressor having a rotor mounted in a central position on said hub portion, said compressor having a rotor in axial alignment with the axis of rotation of said hub and an air intake opening facing upwardly; means for driving said helicopter rotor by jet propulsion including a gas turbine disposed in each of said blades; said gas turbine having a turbine wheel, a secondary compressor impeller, a shaft connecting said turbine wheel to said impeller and having a power take-off portion extending into said hub; said hub having a passage connecting the outlet of said primary compressor to the inlet of each said gas turbine, said hub also including internal wall structure defining a central chamber isolated from said passage; and driving means interposed between said primary compressor rotor and each said turbine power take-off shaft portion, whereby the power required to drive said primary compressor rotor is divided among the gas turbines; said driving means comprising a central driven gear attached to said primary compressor rotor and driving gears individually attached to each said power take-off shaft and engaging said central driven gear, said gears being confined in said chamber.

3. In a jet propelled helicopter rotor having a rotatably supported hub portion, a plurality of airfoil blades attached to said hub and extending radially outwardly therefrom, said blades being provided with longitudinal ducts extending from said hub to exhaust nozzles disposed adjacent the outermost tips of said blades, and an air compressor having a rotor mounted in a central position on said hub portion; a gas turbine disposed in each of said longitudinal ducts, said gas turbine having an air inlet, a gas discharge outlet and a power take-off shaft extending through said air inlet into said hub portion; said hub having a passage acting as a communication between the outlet of said compressor and the inlet of said gas turbine, whereby compressed air is delivered by said compressor to said gas turbine, and driving means interposed between said compressor rotor and said turbine power take-off shaft, said compressor rotor being disposed normal to said turbine power take-off shaft and extending upwardly therefrom, and said hub passage including a plurality of annular outlets and an annular inlet disposed substantially normal to said annular outlets.

4. In a jet propelled helicopter rotor having a rotatably supported hub portion, a plurality of airfoil blades attached to said hub and extending radially outwardly therefrom, said blades being provided with longitudinal ducts extending from said hub to exhaust nozzles disposed adjacent the outermost tips of said blades, and an air compressor having a rotor mounted in a central position on said hub portion: a gas turbine disposed in each of said longitudinal ducts, said gas turbine having an air inlet, a gas discharge outlet and a power take-off shaft extending through said air inlet into said hub portion; said hub having a passage acting as a communication between the outlet of said compressor and the inlet of said gas turbine, whereby compressed air is delivered by said compressor to said gas turbine, and driving means interposed between said compressor rotor and said turbine power take-off shaft, said gas turbine being provided with a casing, said casing being non-rotatably attached to said hub portion, and said airfoil blades being axially rotatable relative to said hub portion.

5. In a jet propelled helicopter rotor having a rotatably supported hub portion, a plurality of airfoil blades attached to said hub and extending radially outwardly therefrom, said blades being provided with longitudinal ducts extending from said hub to exhaust nozzles disposed adjacent the outermost tips of said blades, and an air compressor having a rotor mounted in a central position on said hub portion: a gas turbine disposed in each of said longitudinal ducts, said gas turbine having an air inlet, a gas discharge outlet and a power take-off shaft extending through said air inlet into said hub portion; said hub having a passage acting as a communication between the outlet of said compressor and the inlet of said gas turbine, whereby compressed air is delivered by said compressor to said gas turbine, and driving means comprising inter-engaging gears connecting said compressor rotor and said turbine power take-off shaft, said compressor rotor being disposed normal to said turbine power take-off shaft and extending upwardly therefrom, said hub passage including a plurality of annular outlets and an annular inlet disposed substantially normal to said annular outlets, said hub portion being provided with wall structure defining a central chamber isolated from said hub passage and said gears being disposed in said chamber.

References Cited in the file of this patent

UNITED STATES PATENTS

| | | |
|---|---|---|
| 2,443,936 | Stalker | June 22, 1948 |
| 2,465,856 | Emigh | Mar. 29, 1949 |
| 2,490,623 | Elsby | Dec. 6, 1949 |
| 2,516,489 | Stalker | July 25, 1950 |
| 2,590,457 | Pouit | Mar. 25, 1952 |
| 2,651,376 | Stanitz | Sept. 8, 1953 |
| 2,689,615 | Fletcher | Sept. 21, 1954 |